(12) United States Patent
Sugishita et al.

(10) Patent No.: US 6,212,873 B1
(45) Date of Patent: Apr. 10, 2001

(54) GAS TURBINE COMBINED CYCLE

(75) Inventors: Hideaki Sugishita; Hidetaka Mori; Yoshiaki Tsukuda; Kazuo Uematsu; Eiji Akita, all of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/256,106

(22) Filed: Feb. 24, 1999

(30) Foreign Application Priority Data

Mar. 4, 1998 (JP) .................................................. 10-051879

(51) Int. Cl.$^7$ ...................................................... F02C 6/00
(52) U.S. Cl. ........................................... 60/39.182; 60/728
(58) Field of Search ................................ 60/39.182, 728

(56) References Cited

U.S. PATENT DOCUMENTS

| | | | |
|---|---|---|---|
| 5,386,685 | * 2/1995 | Fruschi | 60/728 X |
| 5,440,871 | * 8/1995 | Dietz et al. | 60/39.182 X |
| 5,724,806 | * 3/1998 | Horner | 60/728 X |
| 5,784,888 | * 7/1998 | Termuehlen | 60/39.182 X |

FOREIGN PATENT DOCUMENTS 9-317047  12/1997  (JP) .

* cited by examiner

Primary Examiner—Hoang Nguyen
(74) Attorney, Agent, or Firm—Wenderoth, Lind & Ponack, L.L.P.

(57) ABSTRACT

The invention provides a gas turbine combined cycle structured such that an intermediate cooling device for cooling a compression air discharged from a low pressure compressor, so as to reduce a load of a high pressure compressor, is provided. The gas turbine combined cycle in accordance with the invention is structured such as to branch water from a condenser to a steam generating device for generating steam. Exhaust gas discharged from a steam turbine is condensed to water. Compression air discharged from a low pressure compressor is cooled by being supplied to an intermediate cooling device, and is then supplied to a high pressure compressor. Steam which heats and operates the steam turbine is generated by the heat recovered by the cooling of the compression air in the intermediate cooling device. Accordingly, there can be obtained a gas turbine combined cycle having the advantage of the conventional intermediate cooling type gas turbine combined cycle, but exhibiting an improved combined efficiency.

21 Claims, 3 Drawing Sheets

GAS TURBINE COMBINED CYCLE

BACKGROUND OF THE INVENTION

1. Field of the Invention

The invention relates to a gas turbine combined cycle or power plant which drives a gas turbine by a combustion gas obtained by blowing a fuel into high pressure air and burning the fuel so as to generate power in the gas turbine. A steam turbine is driven by steam that is generated by recovering heat from an exhaust gas that drives the gas turbine, so as to generate power in the steam turbine. This improves heat efficiency. The gas turbine combined cycle cools compression air discharged from a low pressure compressor before being made into high pressure air by a high pressure compressor, so as to make a drive force of the high pressure compressor driven by the gas turbine small. Heat energy recovered by the cooling is used for driving the steam turbine, thereby further improving the heat efficiency.

2. Description of the Related Art

There has been a conventional gas turbine combined cycled or power plant which drives a gas turbine by a combustion gas obtained by burning high pressure air and a fuel and drives a steam turbine by steam generated by an exhaust gas discharged from the gas turbine.

This gas turbine combined cycle is structured such that the gas turbine, driven by the combustion gas, outputs the drive force for operating a power generator or the like and drives the compressor for generating the combustion gas having a high temperature and a high pressure. The compressor driven by the gas turbine is provided with a low pressure compressor and a high pressure compressor, and compresses introduced ambient air in two steps so as to make high pressure air, and then supplies the air to a combustion device into which fuel is blown so as to generate combustion gas.

That is, the high pressure compressor is structured so as to suck a high temperature compression air, compressed in the low pressure compressor in an adiabatic manner and reaching a temperature of 190° C. or more, and further increase the pressure of the compression air to high pressure air, and then supply the air to the combustion device.

Accordingly, the drive force of the high pressure compressor is increased and much of the drive force generated in the gas turbine is consumed, so that the drive force which the gas turbine can output is reduced. Accordingly, this causes a reduction of efficiency of the gas turbine combined cycle or power plant.

Therefore, there has been employed an intermediate cooling type gas turbine combined cycle or power plant (hereinafter referred to as an intermediate cooling type combined gas turbine cycle or power plant) which is structured so as to cool a high temperature compression air discharged from the low pressure compressor in an intermediate cooling device, and supply the compression air cooled to about 100° C. to a high pressure compressor so as to increase the pressure to of the air to a high pressure. This makes the drive force supplied from the gas turbine for driving the high pressure compressor small so as to improve the magnitude of the drive force supplied by the gas turbine.

FIG. 3 is a systematic view which shows an intermediate cooling type gas turbine combined cycle in accordance with the conventional art.

As shown in the drawing, an intermediate cooling type gas turbine combined cycle or power plant 30 is constituted by a gas turbine portion 10 comprising a power generator 1, a low pressure compressor 2, a high pressure compressor 3, a combustion device 4 (combustor), a gas turbine 5, a rotor cooling cooler 6, cooling towers 7 and 9, and an intermediate cooling device 8. The cooling type gas turbine combined cycle 30 also includes an exhaust gas heat recovery portion 23 comprising a high pressure steam generating device 11, an intermediate steam generating device 12, a low pressure steam generating device 13, a high pressure steam pipe 14, an intermediate pressure steam pipe 15, a low pressure steam pipe 16, a power generator 17, a high pressure steam turbine 18, an intermediate pressure steam turbine 19, a low pressure steam turbine 20, a reheater 21 and a condenser 22.

The high pressure compressor 3, the low pressure compressor 2 and the power generator 1 are coaxially connected to the gas turbine 5 of the gas turbine portion 10, and as mentioned below, the gas turbine 5 is structured so as to drive the compressors via combustion gas so as to transform ambient air A into a predetermined high pressure air for performing a combustion such that power is generated.

At first, the ambient air A is sucked by an intake port of the low pressure compressor 2 driven by the gas turbine 5, compressed in an adiabatic manner and increased to a predetermined low pressure, and then discharged from a discharge port of the low pressure compressor 2 as a high temperature compression air having a temperature equal to or more than 190° C.

When introducing this compression air having a high temperature into the high pressure compressor 3, the drive force of the high pressure compressor 3 required for increasing the pressure of the air is increased, whereby the drive force supplied from the gas turbine 5 for driving the high pressure compressor 3 is also increased such that the drive force for driving the generator 1 is reduced. Thus, the intermediate cooling device 8 having the cooling tower 9 is provided between the discharge port of the low pressure compressor 2 and the suction port of the high pressure compressor 3 so as to cool the compression air discharged from the low pressure compressor 2 to about 100° C. before being introduced into the high pressure compressor 3.

The high pressure air increased by the high pressure compressor 3 is introduced into the combustion device 4, and mixed with a fuel F introduced to the combustion device 4, which is burned so as to produce a combustion gas having a high temperature and a high pressure, whereby the gas turbine 5 is driven in the manner mentioned above.

Further, a part of the high pressure air that is discharged from the high pressure compressor 3, or a high pressure air extracted from a middle step of the high pressure compressor 3 (hereinafter referred to as extracted steam), is cooled to about 200° C. by the rotor cooling cooler 6 and supplied to an inner portion of a rotor blade or a stator blade of the gas turbine 5 that is exposed to the high temperature combustion gas passing within the rotor of the gas turbine 5, thereby cooling the rotor blade or the stator blade from an inner portion thereof.

Still further, the high temperature exhaust gas driving the gas turbine 5, and discharged from the gas turbine 5, is discharged to the ambient air from the chimney 24 via the discharged heat recovery portion 23.

Next, in the exhaust gas heat recovery portion 23, a recovery of the heat from the exhaust gas is performed by successively passing the exhaust gas from the gas turbine 5 through inner portions of the high pressure steam generating device 11, the intermediate pressure steam generating device 12 and the low pressure steam generating device 13, which are arranged in the discharged heat recovery portion 23 so as to respectively generate steam having a high pressure, an intermediate pressure and a low pressure. The steam having the respective pressures is fed to the high pressure steam turbine 18, the intermediate pressure steam turbine 19 and the low pressure steam turbine 20, which are coaxially connected respectively by the high pressure steam pipe 14, the intermediate pressure steam pipe 15 and the low pressure steam pipe 16. The steam expands within the turbines 18, 19 and 20 so as to rotate the respective steam turbines, drive the power generator 17 coaxially connected to the steam turbines, and generate electric energy.

Further, at an outlet of the high pressure steam turbine 18 the exhaust gas driving the high pressure steam turbine 18 is mixed with the intermediate pressure steam generated in the intermediate pressure steam generating device 12 and supplied by the intermediate pressure steam pipe 15. This mixture is heated by the reheater 21 arranged in the exhaust gas heat recovery portion 23, whereby a temperature of this mixture flowing into an inlet of the intermediate pressure steam turbine 19 is increased, such that an output thereof is increased.

Further, at an outlet of the intermediate pressure steam turbine 19, the exhaust gas driving the intermediate pressure steam turbine 19 is mixed with the low pressure steam generated in the low pressure steam generating device 13 and supplied by the low pressure steam pipe 16. This mixture is supplied to the low pressure steam turbine 20.

Still further, at an outlet of the low pressure steam turbine 20, the exhaust vapor gas discharged from the low pressure steam turbine 20 is transformed into water by the condenser 22, which water is supplied to each of the high pressure steam generating device 11, the intermediate pressure steam generating device 12 and the low pressure steam generating device 13.

In the intermediate cooling type gas turbine combined cycle 30 structured in the manner mentioned above, it has been known that the following advantages exist in comparison with the simple gas turbine combined cycle in which a conventional intermediate cooling device is not provided.

(a) It is possible to reduce the power of the high pressure compressor 3 that is required for increasing the pressure of the compression air driven by the gas turbine 5 and compressed by the low pressure compressor 2. The compression air supplied to the combustion device 4 is reduced in temperature at the inlet of the high pressure compressor 3 via the intermediate cooler 8, so that there is an advantage in that the output supplied from the gas turbine 5 to the power generator 1 and the like is increased.

That is, since the power required for the high pressure compressor 3 can be relatively reduced with respect to the output of the gas turbine 5, the power required for the high pressure compressor 3 can be reduced even when the ambient air A is of a high temperature, such that there is an advantage in that a reduction of an efficiency of the gas turbine 5 can be restricted.

(b) Further, also in the conventional simple gas turbine combined cycle, the high pressure air extracted from the high pressure compressor 3 is used for cooling the high temperature portion of the rotor blade, the stator blade and the like of the gas turbine. However, in the intermediate cooling type gas turbine combined cycle, since the temperature of the air at the inlet of the high pressure compressor 3 is reduced by the intermediate cooling device 8, and the high pressure air exiting from the high pressure compressor 3 is cooled by the rotor cooling cooler 6, which air is to be supplied to the high temperature portion of the rotor blade or the stator blade, it is possible to reduce the temperature of the air at the outlet of the high pressure compressor 3, and thereby reduce the temperature of the cooling air used for cooling the high temperature portion of the gas turbine 5, as well as reduce the amount of cooling air flowing from the high pressure compressor 3 via the rotor cooling cooler 6.

This reduction in the amount of cooling air causes a reduction of a mixing loss corresponding to a pressure loss generated when the combustion gas and the cooling air flowing within a turbine gas pass are mixed. This results in an increased efficiency and an increased output of the gas turbine 5, whereby it is possible to increase the output of the gas turbine 5 via an increase in the amount of flow of the high pressure air flowing into the combustion device 4 from the high pressure compressor 3.

(c) Further, it is also possible to increase an efficiency and an output of the gas turbine by reducing the temperature of heat discharged from the rotor cooling cooler 6 to a predetermined air temperature. The heat discharged from the rotor cooling cooler 6 results from using the cooler 6 to reduce the temperature of the extracted air used for cooling the high temperature portion of the gas turbine.

As mentioned above, in accordance with the conventional intermediate cooling type gas turbine combined cycle, there is the advantage that it is possible to increase the gas turbine output and the combined output. However, since the discharged heat from the intermediate cooling device 8 and the rotor cooling cooler 6 is discharged to the ambient air by the cooling towers 7 and 9, the efficiency of the gas turbine 5 is reduced. Further, since the discharged heat from the intermediate cooling device 8 and the rotor cooling cooler 6 has a great disadvantage in that reduction of the efficiency of the exhaust gas heat recovery portion 23 is realized, this intermediate cooling device 8 has not been actually applied to the conventional gas turbine combined cycle.

In this connection, when the compression air discharged from the low pressure compressor 2 at a temperature of at least 190° C. is cooled to about 100° C. by the intermediate cooling device 8 before being supplied to the high pressure compressor 3, the calories discharged from the cooling tower 9 to the ambient air frequently reaches 5 MW. This results in a disadvantage in that the temperature of the high pressure air supplied to the combustion device 4 is reduced, and the efficiency of the gas turbine 5 is also reduced, in spite of the advantages (a) to (c) mentioned above being obtained. Further, there are disadvantages in that the temperature of the exhaust gas from the gas turbine 5 is reduced, the calories recovered by the exhaust gas heat recovery portion 23 is reduced, and the drive force output from the exhaust gas heat recovery portion 23 is also reduced.

SUMMARY OF THE INVENTION

An object of the invention is to provide a gas turbine combined cycle or power plant, which can solve the disadvantages of the known gas turbine combined cycle that exhibits various advantages relative to the simple gas turbine combined cycle. The gas turbine combined cycle solves these disadvantages by providing an intermediate cooling device, and hence is called an intermediate cooling type gas turbine combined cycle or power plant. The intermediate cooling type gas turbine combined cycle provides for an improved heat efficiency and output.

Accordingly, the intermediate cooling type gas turbine combined cycle is structured such as to recover a cooling heat which cools a compression air discharged from a low pressure compressor. The heat is recovered by an intermediate cooling device as the air is being supplied to a high pressure compressor. Heat is also recovered by a rotor air cooler as air exiting the high pressure compressor is supplied through the rotor air cooler to a high temperature portion of a gas turbine. The recovered heat is then conventionally discharged to ambient air via a discharged heat recovery portion, after generating a drive force. Accordingly, a drive force which can be output from an exhaust gas heat recovery portion can be increased, whereby total efficiency of the power plant can be improved.

In order to achieve the object mentioned above, in accordance with the invention, there is provided a gas turbine combined cycle structured such as to branch a condensed water that is circulated to a steam generating device. The steam generating device generates steam by recovering heat from a condenser. The condenser converts exhaust gas that is discharged from a steam turbine into water. Exhaust gas that is discharged from a gas turbine is supplied to the steam turbine. Air that is discharged from a low pressure compressor is cooled and compressed by a high pressure compressor after being supplied to an intermediate cooling device. And, steam is generated which operates a steam turbine so as to produce an output drive force. The output drive force is created by heat that is recovered by the cooling of the compression air in the intermediate cooling device.

Further, in the gas turbine combined cycle in accordance with the invention mentioned above, in addition to the structure mentioned above, it is preferable that the water supplied to the intermediate cooling device is heated so as to generate steam. Steam is also generated by heat recovered from a rotor cooling cooler, which cools a part of the high pressure air discharged from the high pressure compressor. The rotor cooling cooler heat cools a high temperature portion of the gas turbine, or air extracted from a proper step of the high pressure compressor.

Accordingly, since the structure discharges the heat recovered in the intermediate cooling device and the rotor cooling cooler, while having the advantages (a) to (c) mentioned above, there were the disadvantages that the gas turbine efficiency was reduced and the efficiency of the exhaust gas heat recovery portion was also reduced. With respect to the disadvantages in the intermediate cooling type gas turbine combined cycle provided with the intermediate cooling device, wherein the discharged heat is recovered in the intermediate cooling device and the rotor cooling cooler and then discharged to the ambient air after generating a drive force, it is possible to increase the drive force and to improve a total efficiency of the plant. Therefore, it is possible to solve at least the disadvantage that the efficiency of the discharged heat recovery portion in the conventional intermediate cooling type gas turbine combined cycle is reduced. Accordingly, it is possible to make an intermediate cooling type combined gas turbine provided with the intermediate cooling device, i.e. a gas turbine combined cycle which can sufficiently exhibit the advantages (a) to (c) mentioned above.

Further, in accordance with the invention, in addition to the structure mentioned above, there is provided a steam turbine which comprises a high pressure steam turbine, an intermediate pressure steam turbine and a low pressure steam turbine. Steam generated from water, or from heat recovered by cooling extracted air that is discharged from the low pressure compressor, is supplied to any one of the intermediate pressure steam turbine and the low pressure steam turbine, whereby these steam turbines are operated and the drive force is improved.

That is, in the gas turbine combined cycle in accordance with the invention, since the compression air discharged from the low pressure compressor is cooled before being supplied to the high pressure compressor, it is possible to recover the heat which is recovered in the intermediate cooling device, as well as the heat which is recovered in the rotor cooling cooler. This enables the extracted air from the high pressure compressor to be cooled, which cooled air is then used to cool the high temperature portion of the gas turbine, and then conventionally discharged to the ambient air via a discharged heat recovery portion. Further, it is possible to convert the heat recovered in the exhaust gas heat recovery portion into a large drive force, thereby further increasing the drive force capable of being output from the exhaust gas heat recovery portion, and thereby further improving the efficiency of the power plant.

DESCRIPTION OF THE PREFERRED EMBODIMENTS

Hereinafter, an embodiment of a gas turbine combined cycle or power plant in accordance with the invention will be described below with reference to the drawings.

First Embodiment

Figure 1:
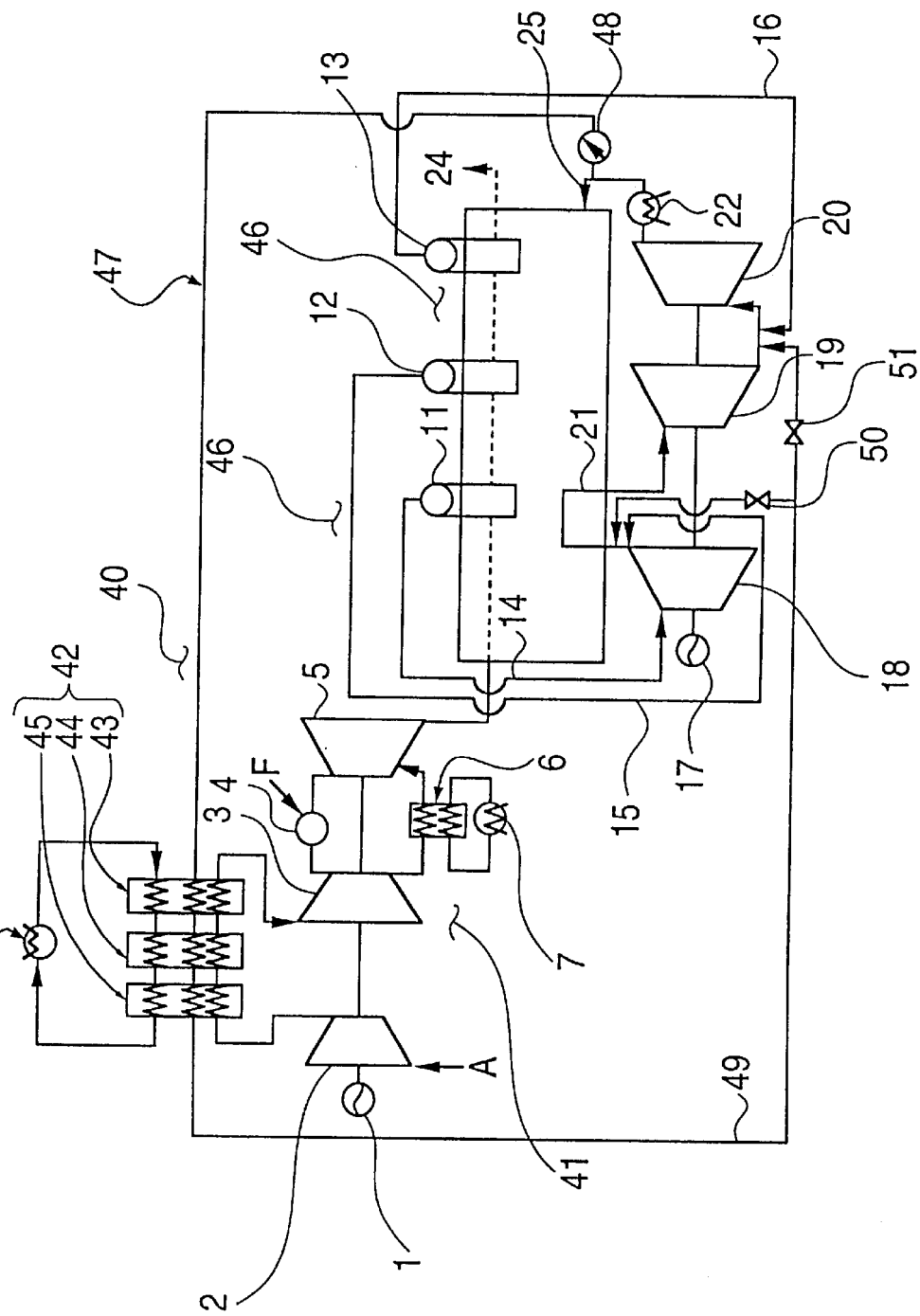
FIG. 1 is a systematic view which shows an intermediate cooling type gas turbine combined cycle as a first embodiment of a gas turbine combined cycle in accordance with the invention.

FIG. 1 is a systematic view which shows an intermediate cooling type gas turbine combined cycle as a first embodiment of a gas turbine combined cycle in accordance with the invention.

Figure 3:
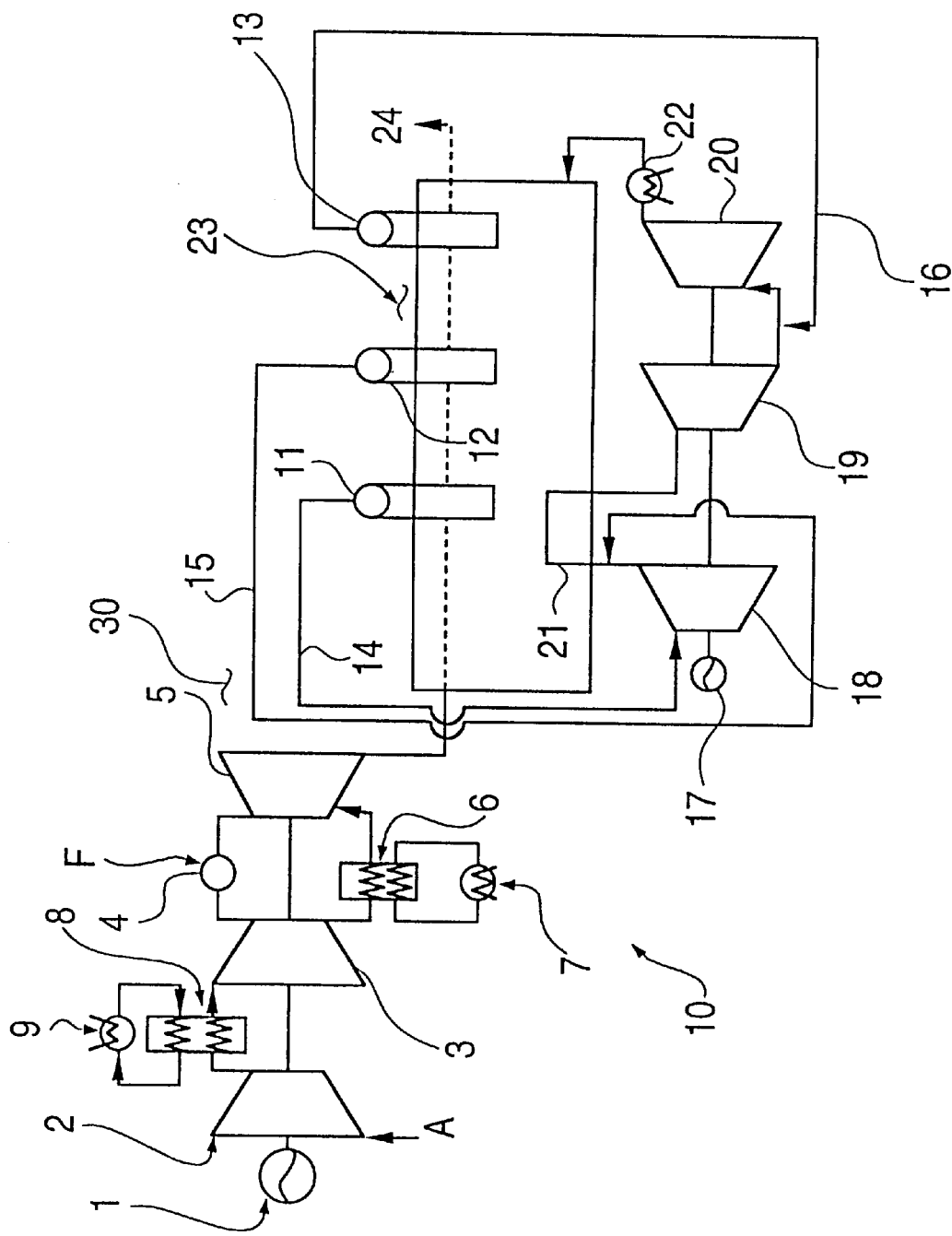
FIG. 3 is a systematic view which shows an intermediate cooling type combined gas turbine cycle in accordance with the prior art.

In this case, in the drawing, the same reference numerals are attached to the same elements as those shown in FIG. 3, and a detailed explanation thereof will be omitted.

A gas turbine portion 41 of the intermediate cooling type gas turbine combined cycle in accordance with this embodiment is provided with the same elements as the gas turbine portion 10 as shown in FIG. 3. The turbine portion 41 includes a power generator 1, a low pressure compressor 2, a high pressure compressor 3, a combustion device 4, a gas turbine 5, a rotor cooling cooler 6, and cooling towers 7 and 9.

Further, in place of the intermediate cooling device 8 shown in FIG. 3, the gas turbine combined cycle of this embodiment is provided with an intermediate cooling device 42 that includes an economizer 43, an evaporator 44 and a super heater 45.

The gas turbine portion 41 is structured in the same manner as that of the gas turbine 10 shown in FIG. 3, whereby the high pressure compressor 3 is coaxially connected with the low pressure compressor 2 and the power generator 1. The compressors are operated by the gas turbine 5 which is driven by the combustion gas as mentioned below. The gas turbine portion 41 generates a predetermined high pressure air for burning the ambient air and generating power.

However, the intermediate cooling device 42 for cooling the compression air, discharged from the low pressure compressor 2, from about 190° C. to about 100° C. includes the economizer 43, the evaporator 44 and the super heater 45. Thus, the heat which deteriorates a heat efficiency of the conventional intermediate cooling type gas turbine combined cycle 30 is recovered in the intermediate cooling device 42 and is converted into power in an exhaust gas heat recovery portion 46 without being discharged to the ambient air. Accordingly, the disadvantage in that the efficiency of the exhaust gas heat recovery portion 23 is reduced due to the provision of the intermediate cooling device 8 as shown in FIG. 3, can be avoided. Thus, various advantages related to the gas turbine combined cycle 40 can be realized.

In the present invention, the cooling tower 9 for discharging the recovered heat to the ambient air is provided in the same manner as that shown in FIG. 3. However, the cooling tower 9 in accordance with the present invention is only used as a back up in case water is not sufficiently supplied to the intermediate cooling device 42 such that a temperature of the cooling air at an outlet of the high pressure compressor 3 is increased and a risk of an unacceptably high stress for a turbine blade is realized when a partial load is applied The cooling tower 9 is not used near a rated point of the intermediate cooling type gas turbine combined cycle 40.

In the exhaust gas heat recovery portion 46, there are provided the same elements as the exhaust gas heat recovery shown in FIG. 3. The exhaust gas heat recovery portion 46 includes a high pressure steam generating device 11, an intermediate pressure steam generating device 12, a low pressure steam generating device 13, a high pressure steam pipe 14, an intermediate pressure steam pipe 15, a low pressure steam pipe 16, a power generator 17, a high pressure steam turbine 18, an intermediate pressure steam turbine 19, a low pressure steam turbine 20, a reheater 21 and a condenser 22.

Further, in the exhaust gas heat recovery portion 46, there is provided a pressurized water pipe 47 provided in such a manner as to branch from a condensed water supply pipe 25 for supplying water from the condenser 22 to each of the steam generating devices 11, 12 and 13. A pressurizing pump 48 for supplying the water to the intermediate cooling device 42 is interposed between the water pipe 47 and the supply pipe 25. Also provided is a steam pipe 49 for supplying heated steam, obtained by evaporating the water used to recover heat by the intermediate cooling device 42, to the outlet of the high pressure steam turbine 18 and the outlet of the intermediate pressure steam turbine 19. Valves 50 and 51 are respectively provided in a connection portion of the steam pipe 49 leading to the outlet of the high pressure steam turbine 18, and a connection portion of the steam pipe 49 leading to the outlet of the intermediate pressure steam turbine 19.

In the exhaust gas heat recovery portion 46, in the same manner as that of the exhaust gas heat recovery portion 23 shown in FIG. 3, the heat recovery is performed by successively passing the high temperature exhaust gas, discharged from the gas turbine 5 through the inner portions of the high pressure steam generating device 11 such that a high pressure steam is generated, the intermediate pressure steam generating device 12 such that an intermediate pressure steam is generated, and the low pressure steam generating device 13 such that a low pressure steam is generated. The respective steams are fed to the high pressure steam turbine 18, the intermediate pressure steam turbine 19 and the low pressure steam turbine 20, which are coaxially connected by the high pressure steam pipe 14, the intermediate pressure steam pipe 15 and the low pressure steam pipe 16, respectively, so that the steam turbines 18, 19 and 20 are operated and the output forces thereof drive the power generator 17, which is coaxially connected to the steam turbines 18, 19 and 20, so as to generate electric energy. Any high temperature gas passing through the low pressure steam generating device 13, and not fed to the low pressure steam turbine 20, is discharged from chimney 24 into the ambient air.

Further, in the outlet of the high pressure steam turbine 18 the exhaust gas of the high pressure steam turbine 18 is mixed with the intermediate pressure steam generated in the intermediate pressure steam generating device 12. This mixed steam is supplied through the intermediate pressure steam pipe 15, and thereafter heated by the reheater 21. This increases the temperature of the steam at the inlet of the intermediate pressure steam turbine 19. Then, the mixed steam is supplied to the intermediate pressure steam turbine 19, such that the output of the intermediate pressure turbine 19 is increased. Further, in the outlet of the intermediate pressure steam turbine 19, the exhaust gas of the intermediate pressure steam turbine 19 is mixed with the low pressure steam generated in the low pressure steam generating device 13. This mixed steam is supplied through the low pressure steam pipe 16, and thereafter supplied to the low pressure steam turbine 20.

Further, in the outlet of the low pressure steam turbine 20, the exhaust vapor gas discharged from the low pressure steam turbine 20 is changed to water via condenser 22, which water is to be supplied to each of the high pressure steam generating device 11, the intermediate pressure steam generating device 12 and the low pressure steam generating device 13.

Still further, in the exhaust gas heat recovery portion 46 a part of the water to be supplied from the condenser 22 to the steam generating devices 11, 12 and 13 is branched in the outlet of the condenser 22, increased to a predetermined pressure via the pressurizing pump 48, and then supplied to the intermediate cooling device 42 through the pressurized water pipe 47.

The pressurized water supplied to the intermediate cooling device 42 at first becomes a saturated water in the economizer 43, further becomes a saturated steam in the evaporator 44, and finally becomes a heated steam in the super heater 45.

As mentioned above, the calories which are conventionally discharged to the ambient air in the cooling tower 9, supplied to the high pressure compressor 3 by cooling the compression air discharged from the low pressure compressor 2, and recovered in the intermediate cooling device 42, are used for increasing a temperature of the pressurized water so as to make heated steam.

Further, the heated steam includes the exhaust vapor gas of the high pressure steam turbine 18 mixed with the intermediate pressure steam that is generated in the intermediate pressure steam generating device 12 and supplied through the intermediate pressure steam pipe 15 at the inlet of the reheater 21. That is, the steam exiting from the outlet of the high pressure steam turbine 18 and flowing through the heated steam pipe 49 is heated by the reheater 21, and then supplied to the intermediate pressure steam turbine 19 so as to increase the output of the intermediate pressure steam turbine 19. Alternatively, the exhaust gas of the intermediate pressure steam turbine 19 is mixed with the low pressure steam generated in the low pressure steam generating device 13 and supplied through the low pressure steam pipe 16 into the low pressure steam turbine 20. That is, the steam exiting from outlet of the intermediate pressure steam turbine 19 is supplied to the low pressure steam turbine 20 so as to increase the output of the low pressure steam turbine 20.

At this time, when pressurizing the branched water in the pressurizing pump 48 to a pressure having the same value as that of the intermediate pressure steam, which is to be supplied to the intermediate pressure steam turbine 19 (or the reheater 21), it is possible to supply the heated steam to the inlet of the reheater 21 by fully opening the valve 50 and filly closing the valve 51.

Further, when pressurizing the branched water in pump 48 to a pressure having the same level as that of the low pressure steam to be supplied to the low pressure steam turbine 20, it is possible to supply the heated steam to the inlet of the low pressure steam turbine 20 by fully closing the valve 50 and fully opening the valve 51.

Next, a heat exchange performed in the intermediate cooling device 42 between the pressurized water and the heat recovered in the intermediate cooling device 42 will be described below with reference to FIG. 2.

Figure 2:
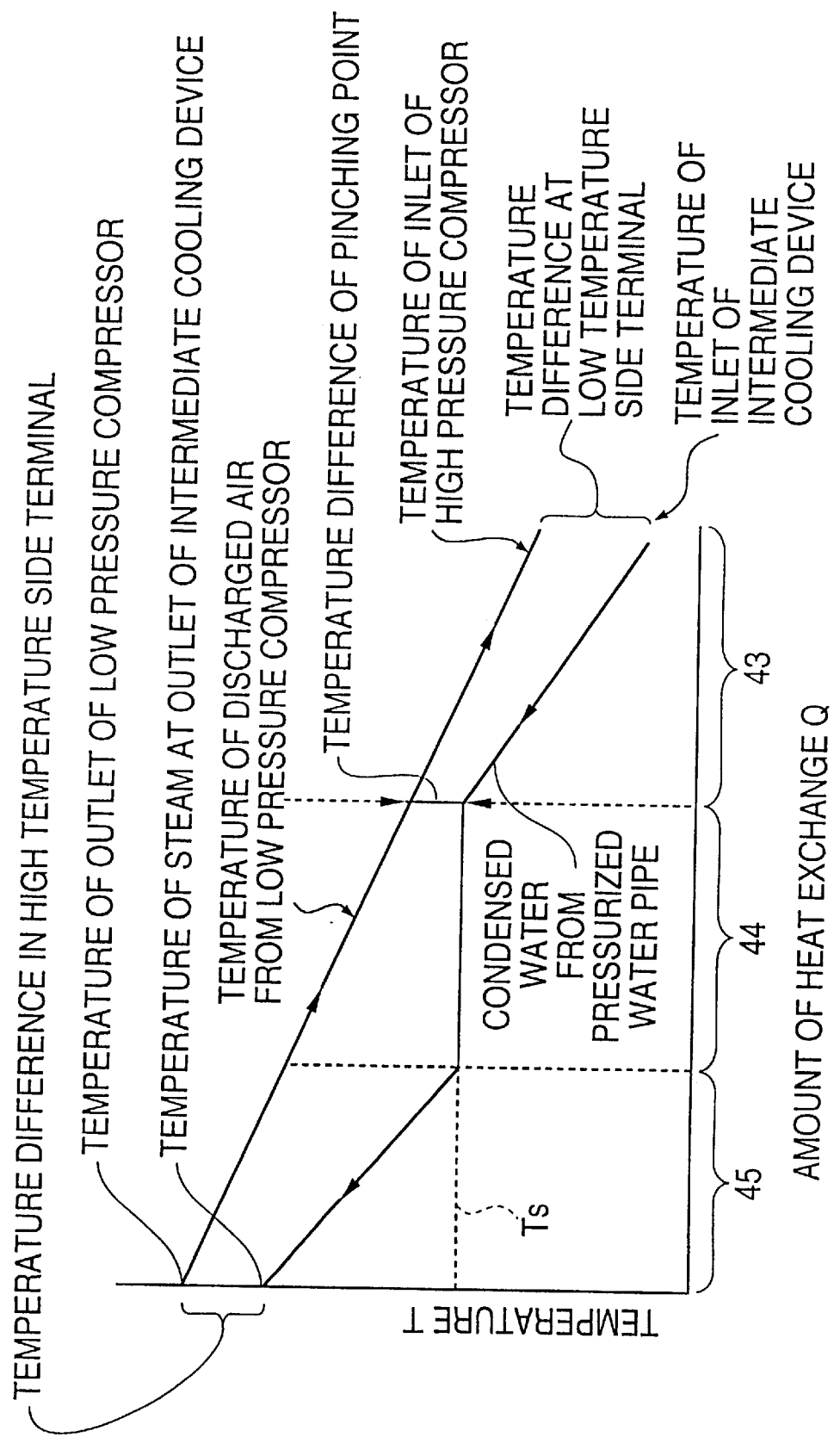
FIG. 2 is a diagram which shows a heat exchange in an intermediate cooling device shown in FIG. 1.

A vertical axis in FIG. 2 indicates a temperature T and a horizontal axis indicates an amount of the heat exchange in each of the economizer 43, the evaporator 44 and the super heater 45.

The water pressurized by the pressurizing pump 48 is supplied to the economizer 43 through the pressurized water pipe 47. In the economizer 43, the condensed water is heated to a saturation temperature Ts. The pressure of the water is equal to the pressure of the intermediate pressure steam or the pressure of the low pressure steam.

The water heated to the saturation temperature Ts in the economizer 43 is further heated by the evaporator 44 so as to becomes a saturated steam, which is supplied to the super heater 45 where it becomes a super-heated steam. However, the amount of the steam generated from the pressurized water is determined by a temperature difference of a terminal in a high temperature side and a temperature difference of a pinching point.

When the amount of the steam generated in the intermediate cooling device 42 is determined, an amount of the heat exchange in the economizer 43 is determined and the temperature of the inlet of the high pressure compressor 3 is also determined.

As mentioned above, in the intermediate cooling type gas turbine combined cycle 40 employed in the gas turbine combined cycle in accordance with this invention, the calories conventionally discharged to the ambient air in the cooling tower 9 and recovered in the intermediate cooling device 42 is changed to heated steam by the economizer 43, the evaporator 44 and the super heater 45 of the intermediate cooling device 42 while using the water pressurized by the pressurizing pump 48. The heated steam is supplied to the inlet of the reheater 21 or the inlet of the low pressure steam turbine 20, whereby the calories are recovered as the output of the intermediate pressure steam turbine 19 or the low pressure steam turbine 20, and efficiently used. Accordingly, there can be obtained an advantage of improving a so-called combined efficiency, i.e. the outputs of the gas turbine portion 41 and the exhaust gas heat recovery portion 46 are combined in addition to the output of the discharged heat recovery portion.

Therefore, since it is possible to resolve the disadvantage that the combined efficiency becomes lower than that of the simple cycle, which corresponds to the problem of the intermediate cooling type gas turbine combined cycle 30 in accordance with the conventional art, a gas turbine combined cycle can be provided which efficiently uses the advantages which are inherent in the intermediate cooling type gas turbine combined cycle.

Further, since it is possible to freely set the pressure level of the water to a level of the intermediate pressure steam pressure or the low pressure steam pressure, the amount of the steam generated in the intermediate cooling device 42 can be maximized so as to widely recover the output when a partial load is applied to the gas turbine.

Second Embodiment

Further, although an illustration is omitted in FIG. 1, it is possible to use recovered heat, resulting from cooling the steam extracted from a part of the high pressure air discharged from the high pressure compressor 3, or from a predetermined step of the high pressure compressor 3, which steam has temperature of about 200° C. and a high pressure and is recovered by the rotor cooling cooler 6, for generating cooled air for cooling the rotor blade or the stator blade exposed to the high temperature combustion gas of the gas turbine 5. The blades can be cooled by passing the cooled air therethrough.

That is, in FIG. 1, there is shown the embodiment in which the heat recovered in the rotor cooling cooler 6 is discharged to the ambient air via the cooling tower 7. However, steam generated from the water flowing through the economizer 43, the evaporator 44 and the super heater 45 can also be used to recover heat.

However, the temperature of the extracted steam is significantly higher than that of the compression air discharged from the low pressure compressor 2, which is about 190° C. The temperature of the cooled air supplied to the high temperature portion of the gas turbine 5 from the rotor cooling cooler 6 is set to about 200° C., which is higher than the temperature of the compression air discharged from the low pressure compressor 2, and the flow amount of the cooled air is set to be sufficiently smaller than the flow amount of the high pressure air supplied from the high pressure compressor 3 to the combustion device 4 and used for the combustion. Accordingly, efficiency of the gas turbine is increased, as is an output thereof. It is preferable that there is provided a super heater for further heating the steam supplied to the outlet of the high pressure steam turbine 18 and to the outlet of the intermediate pressure steam turbine 19, from the super heater 45 of the intermediate cooling device 42 via steam pipe 49, because further advantages can be realized in view of this additional super heater.

As mentioned above, in addition to the heat recovered in the intermediate cooling device 42, heat is also recovered in the rotor cooling cooler 6, so that there can be obtained a gas turbine combined cycle which can realize the advantages that are inherent with an intermediate cooling type gas turbine combined cycle, but in a more efficient manner. The efficiency of the intermediate cooling type gas turbine combined cycle is greater than that of the simple cycle, and the power plant exhibits an improved efficiency.

What is claimed is:

1. A combined cycle power plant comprising:
   a gas turbine portion including
   (i) a low pressure compressor to compress air supplied thereto,
   (ii) an intermediate cooling device to cool compressed air that is discharged from said low pressure compressor, and also to generate steam from water supplied to the intermediate cooling device,
   (iii) a high pressure compressor to compress the compressed air discharged from said intermediate cooling device,
   (iv) a combustion device to burn fuel along with the compressed air discharged from said high pressure compressor such that a combustion gas is generated, and (v) a gas turbine to be driven by the combustion gas generated by said combustion device; and an exhaust gas heat recovery portion including
(i) a steam generating device to recover heat from an exhaust gas discharged from said gas turbine, and use this recovered heat to generate steam,
(ii) a steam turbine to be driven by the steam generated by said steam generating device, and
(ii) a condenser to condense an exhaust vapor gas discharged from said steam turbine into water.

2. The combined power plant according to claim 1, and further comprising a system to supply the steam generated by said intermediate cooling device to said steam turbine to drive said steam turbine.

3. The combined power plant according to claim 2, and further comprising a system to supply water from said condenser to said intermediate cooling device, wherein the water supplied from said condenser to said intermediate cooling device is transformed into the steam generated at said intermediate cooling device.

4. The combined power plant according to claim 3, wherein said system to supply water from said condenser to said intermediate cooling device is also to supply water from said condenser to said steam generating device, wherein the water supplied from said condenser to said steam generating device is transformed into the steam generated at said steam generating device.

5. The combined power plant according to claim 4, wherein said system to supply water from said condenser to said intermediate cooling device and said steam generating device includes a branched line, with one branch interconnecting said condenser with said steam generating device, and with another branch interconnecting said condenser with said intermediate cooling device.

6. The combined power plant according to claim 5, and further comprising a system to supply air discharged from said high pressure compressor to a cooler and then to a high temperature portion of said gas turbine in order to cool the high temperature portion of said gas turbine.

7. The combined power plant according to claim 6, and further comprising a system to supply steam generated at the high temperature portion of said gas turbine, due to cooling thereof via the air passed to and from the cooler, to said steam turbine for driving said steam turbine.

8. The combined power plant according to claim 7, wherein said steam turbine includes a high pressure steam turbine and a low pressure steam turbine, and wherein said system to supply the steam generated by said intermediate cooling device to said steam turbine is to supply the steam generated by said intermediate cooling device to an outlet of said high pressure steam turbine and an inlet of said low pressure steam turbine.

9. The combined power plant according to claim 8, wherein said steam turbine further includes an intermediate pressure steam turbine, and wherein said system to supply the steam generated by said intermediate cooling device to an outlet of said high pressure steam turbine and an inlet of said low pressure steam turbine is also to supply the steam generated by said intermediate cooling device to said intermediate pressure steam turbine.

10. The combined power plant according to claim 5, wherein said steam turbine includes a high pressure steam turbine, an intermediate pressure steam turbine and a low pressure steam turbine, and wherein said system to supply the steam generated by said intermediate cooling device to said steam turbine is to supply the steam generated by said intermediate cooling device to any one of said intermediate pressure steam turbine and said low pressure steam turbine.

11. The combined power plant according to claim 5, wherein said intermediate cooling device includes a super heater.

12. The combined power plant according to claim 5, wherein said intermediate cooling device includes an economizer, an evaporator and a super heater.

13. The combined power plant according to claim 5, wherein said steam turbine includes a high pressure steam turbine and a low pressure steam turbine, and wherein said system to supply the steam generated by said intermediate cooling device to said steam turbine is to supply the steam generated by said intermediate cooling device to an outlet of said high pressure steam turbine and an inlet of said low pressure steam turbine.

14. The combined power plant according to claim 13, wherein said steam turbine further includes an intermediate pressure steam turbine, and wherein said system to supply the steam generated by said intermediate cooling device to an outlet of said high pressure steam turbine and an inlet of said low pressure steam turbine is also to supply the steam generated by said intermediate cooling device to said intermediate pressure steam turbine.

15. The combined power plant according to claim 2, wherein said steam turbine includes a high pressure steam turbine and a low pressure steam turbine, and wherein said system to supply the steam generated by said intermediate cooling device to said steam turbine is to supply the steam generated by said intermediate cooling device to an outlet of said high pressure steam turbine and an inlet of said low pressure steam turbine.

16. The combined power plant according to claim 15, wherein said steam turbine further includes an intermediate pressure steam turbine, and wherein said system to supply the steam generated by said intermediate cooling device to an outlet of said high pressure steam turbine and an inlet of said low pressure steam turbine is also to supply the steam generated by said intermediate cooling device to said intermediate pressure steam turbine.

17. The combined power plant according to claim 2, wherein said steam turbine includes a high pressure steam turbine, an intermediate pressure steam turbine and a low pressure steam turbine, and wherein said system to supply the steam generated by said intermediate cooling device to said steam turbine is to supply the steam generated by said intermediate cooling device to any one of said intermediate pressure steam turbine and said low pressure steam turbine.

18. The combined power plant according to claim 2, wherein said intermediate cooling device includes a super heater.

19. The combined power plant according to claim 2, wherein said intermediate cooling device includes an economizer, an evaporator and a super heater.

20. The combined power plant according to claim 1, wherein said intermediate cooling device includes a super heater.

21. The combined power plant according to claim 1, wherein said intermediate cooling device includes an economizer, an evaporator and a super heater.

* * * * *